United States Patent [19]

Lerman et al.

[11] Patent Number: 4,790,518
[45] Date of Patent: Dec. 13, 1988

[54] AUTOMATICALLY RECHARGING AIR SPRING

[75] Inventors: Michael J. Lerman, Edison; William B. Zamory, Sommerville, both of N.J.

[73] Assignee: De Dietrich (USA), Inc., Union, N.J.

[21] Appl. No.: 852,593

[22] Filed: Apr. 16, 1986

[51] Int. Cl.$^4$ ............................ E05F 3/00; F16F 5/00; F16F 9/14; B62D 25/00
[52] U.S. Cl. .................................... 267/64.11; 16/84; 188/297; 220/260; 267/64.17; 267/120; 296/56
[58] Field of Search .............. 267/64.11, 64.16, 64.17, 267/113, 120, 126, 64.15, 64.28; 188/300, 322.15, 322.22, 322.17, 282, 301, 313, 316, 297; 16/66, 84; 220/260, 335; 296/56, 57 A

[56] References Cited

U.S. PATENT DOCUMENTS

| | | | |
|---|---|---|---|
| 1,036,340 | 8/1912 | Rockwell | 16/66 X |
| 2,074,008 | 3/1937 | Wolf | 16/84 |
| 3,020,581 | 2/1956 | Falk | 16/66 |
| 3,249,961 | 5/1964 | Quinn | 16/66 |
| 3,348,835 | 10/1967 | Casey | 267/64.17 X |
| 3,494,606 | 2/1970 | Hanchen | 267/64.11 X |
| 3,752,461 | 8/1973 | Gratzmuller | 267/113 |
| 3,856,287 | 12/1974 | Freitag | 188/322.17 |
| 3,963,227 | 6/1976 | Molders | 296/56 X |
| 3,979,790 | 9/1976 | Chiarappa | 16/84 |
| 4,045,008 | 8/1977 | Bauer | 267/64.11 X |
| 4,190,239 | 2/1980 | Schankhart | 267/64.15 |
| 4,372,461 | 2/1983 | Lerman et al. | 220/260 |
| 4,380,847 | 4/1983 | Tajima | 267/120 |
| 4,382,311 | 5/1983 | Watts | 16/66 |

Primary Examiner—Andres Kashnikow
Assistant Examiner—Robert J. Oberleither
Attorney, Agent, or Firm—Pennie & Edmonds

[57] ABSTRACT

An air spring assembly is connected to a member in the form of a cover, door or panel for movement between a position at which the member closes an opening and a position at which the member is removed from the opening. The member is movable between limit positions and the air spring assembly assists in movement. If any portion of the original charge attained by the air spring is lost due to leakage, the air spring assembly is automatically charged during movements of the member so that a piston rod is able to exert a predetermined force on the member.

16 Claims, 3 Drawing Sheets

AUTOMATICALLY RECHARGING AIR SPRING

TECHNICAL FIELD

The present invention is in a mechanism for use with a member, such as a cover capable of movement, for providing assist in moving the member between a position at which the member closes an opening to a confined space and a position at which the member is removed from the opening.

BACKGROUND OF THE INVENTION

Mechanisms associated with a member movable between a position at which the member closes an opening to a confined space and a position at which the member is removed from the opening are known. Mechanisms of this type are used with doors and may be generally characterized as a door check device. Representative prior art disclosures are found in U.S. Pat. Nos. 3,020,581 (Falk), 3,249,961 (Quinn), 3,979,790 (Chiarappa), 4,380,847 (Tajima) and 4,382,311 (Watts). While the prior art is somewhat relevant to the invention, it goes no further than to disclose various forms of door check device, none of which have a capability of being automatically charged thereby to provide a balancing action in assist in movement of a movable member.

Mechanisms in common use for assisting in the opening of doors and lifting of appliance panels, known as "air springs", exert only a pushing force and cannot be recharged when the initial charge is lost through leakage to the atmosphere. Thus, the commonly used air springs must be discarded and replaced, and cannot be used when a pulling force is required.

The prior art also includes U.S. Pat. No. 4,372,461 (Lerman et al) which is also relevant to the invention. To this end, the Lerman et al patent discloses a mechanism connected to a pivotal member, more particularly the cover of a vessel which may be of large size and weight, to assist in movement of the cover between a position at which the cover closes an opening to a confined space and a position removed therefrom. According to the Lerman et al patent, in addition to providing a capability of assist in movement of the cover, the mechanism also will permit the cover to move to and remain in substantially any position between its limits of movement without support. In addition, the mechanism will prevent movement of the cover in an unimpeded manner to the closed position.

SUMMARY OF THE INVENTION

The present invention is in a mechanism, which may be characterized as an air spring assembly, having capability of use with many types of movable structure to assist in movement of the structure within its limits of movement between two positions and may provide either a pushing or a pulling force. The air spring assembly of the invention, as an improvement of the structure disclosed in the Lerman et al patent, has the capability of being automatically charged following an initial operation to balance the force that a rod of the air spring assembly may exert on the structure to be moved. According to the invention, the air spring assembly has a capability of automatic charging each and every time the structure is moved through a complete cycle of movement by opening and closing (or vice versa) the structure if any portion of the initial charge has been lost by leakage to the atmosphere. The air spring assembly also has the capability of adjustment of a maximum force that the rod may exert on the structure.

In a preferred embodiment of the invention the air spring assembly is formed by a pneumatic cylinder including a piston and a piston rod movable between limits of movement along the cylinder. The pneumatic cylinder is mounted on a stationary structure defining an opening to be closed and the piston rod is connected to the movable structure defining a cover for closing the opening. The cylinder is capable of being charged automatically to a predefined level of charge upon movement of the piston and piston rod in following movement of the cover. Each and every cycle of movement after a full charge will serve to recharge the cylinder to compensate for any leakage of air to the atmosphere as may occur, but the cylinder will not become overcharged.

In a further embodiment of the invention the maximum pressure exerted on the piston will be determined by varying the cylinder stroke, piston travel and the ratio of volumes between subchambers within the main chamber to the left and right of the piston. The subchambers generally are defined by the distance of the piston from the cap end and rod end of the cylinder and the ratio of volumes between the subchambers may be adjusted by positioning an interlink connection between the piston rod and structure which mounts the cover for movement, or by the addition of external reservoirs at the cap or rod end of the cylinder.

BEST MODE FOR CARRYING OUT THE INVENTION

Figure 1:
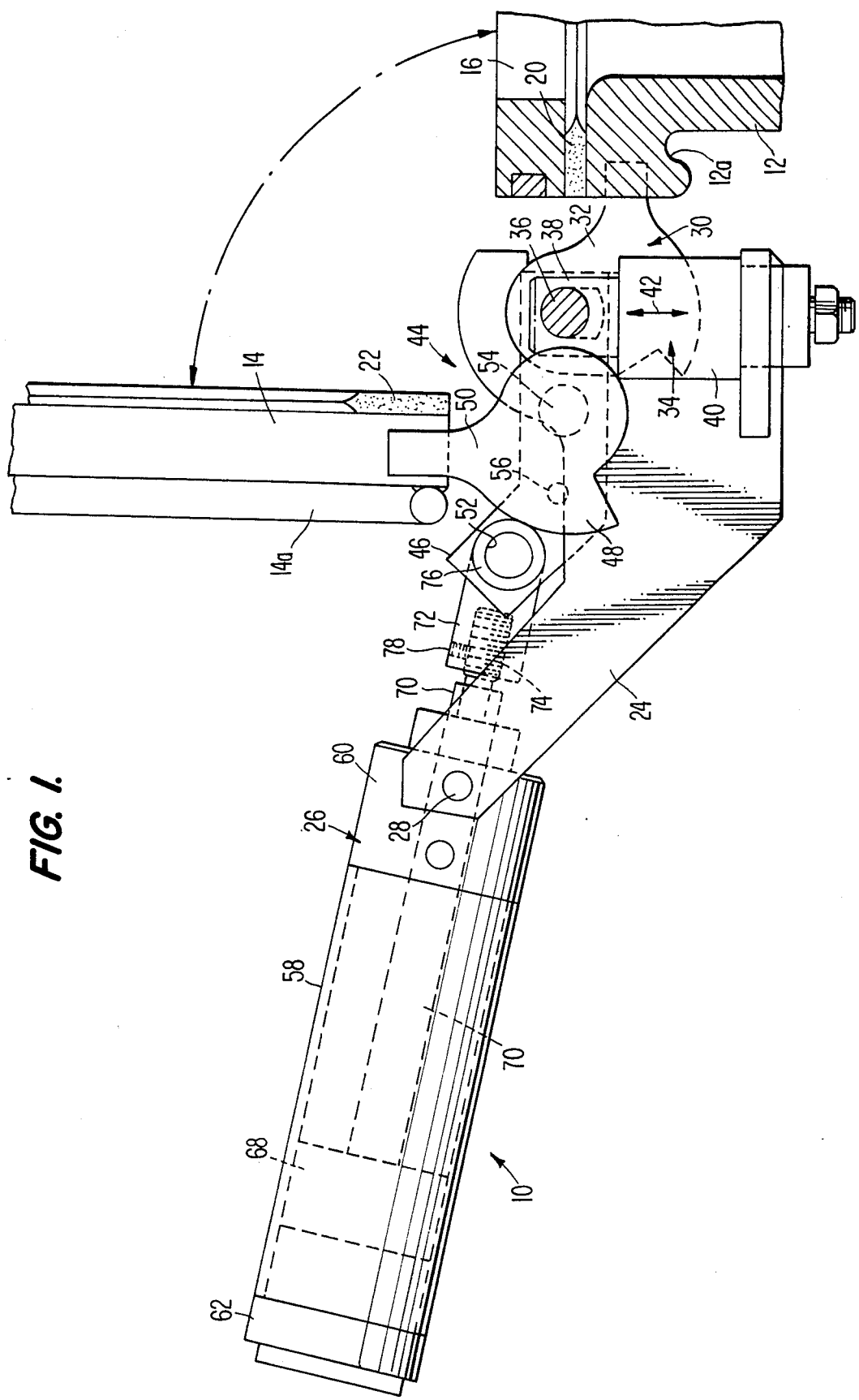
FIG. 1 is a view in elevation of an air spring assembly, a cover for closing an opening in the form of a nozzle of a glass-lined vessel and structure connecting the cover and nozzle to the air spring assembly.

Referring to FIG. 1, there is a general showing of an air spring assembly 10 and a portion of a nozzle 12 of a vessel which may have substantial internal capacity. The vessel is of the type having a metal wall to withstand high pressures as may be developed therein, including a glasslined internal coating throughout to isolate the vessel wall from reactant materials. These vessels frequently used in the chemical industry are well-known. As may be known, also, the nozzle oftentimes is quite large. Thus, the nozzle has been described as a "manway nozzle" or "manhole nozzle" (hereafter "nozzle"). A cover 14 for closing the nozzle, described as a "manway cover" or "manhole cover" (hereafter "cover"), similarly will be quite large to accommodate to the nozzle. In addition, the cover also may be quite heavy and difficult to control in movement. It is the purpose of the air spring assembly to assist in movement of the cover to an open position, illustrated in FIG. 1, from a closed position and in movement of the cover in return. With further reference to FIG. 1, there is a showing of structure for supporting the air spring assembly on the nozzle, and structure connecting the air spring assembly to the cover to provide assist in its opening and closing movement.

While the air spring assembly may be applied in a wide and varied use, such as, for example, an assembly used in cooperation with the movable deck of the trunk of an automobile, and, for that matter with other closures for a space mounted for movement between open and closed positions, the present description will be directed to the use of the air spring assembly to assist in movement and stabilization of the cover of a nozzle of the type described heretofore between open and closed positions.

With continued reference to FIG. 1, cover 14 is illustrated in the open position, having cleared a position of engagement of the various sealing components provided both on the nozzle and the cover which closes the nozzle. The sealing components include a protection ring 16 and a pair of gaskets 20, 22. The protection ring is an annular structure which may be formed of solid glass-filled polytetrafluoroethylene (TEFLON). The gaskets likewise are annular structures having the form of an outer envelope of TEFLON material, filled with a compressible material, such as asbestos or the like. As illustrated, the protection ring resides on the lip of the nozzle in a position separated from the nozzle by gasket 20. The gasket 22 is disposed on cover 14 in position to act against the protection ring when the cover is closed.

For further details concerning the opening of nozzle 12 and the manner by which cover 14 both seals the opening and is secured to the opening in a sealing relation reference may be had to the Lerman et al patent previously identified.

Air spring assembly 10 is supported on nozzle 12 and, in turn, acts upon cover 14 in the assist of movement and stabilization of the cover in position between the open and closed positions. The support structure for the air spring assembly includes a first pair of brackets 24, a second pair of brackets 30 (only one bracket of each pair is shown in FIG. 1) and an assembly 34. The brackets 24 are spaced apart along their lengths and one end of each bracket is connected to housing 26 of air spring assembly 10. The connection may be provided by a pair of pins 28 (again, only one pin is shown) received through the respective brackets into the housing thereby to permit movement of the housing about a pivot axis defined by each mounting pin. The brackets 30 are also spaced apart along their lengths and connected to nozzle 12 at the spaced locations. Any manner of connection may be resorted to. The brackets 30 extend to a rounded end 32 and together with the extending ends of brackets 24 provide a mount for the assembly 34.

Again, reference may be had to the Lerman et al patent for a description and function of the assembly 34, and that discussion is incorporated herein by reference. Briefly, however, the assembly, in addition to the function of supporting the air spring assembly 10 on nozzle 12, serves to provide a constant force on a pivot pin 36 and a lifter member 38 to relocate the pivot pin prior to movements of the cover for prevention of damage to any gasket or sealing structure disposed around nozzle 12 or on cover 14, itself. The damage to be prevented is damage which otherwise may occur through an abrading action upon sliding contact of members, for example, the gasket 22 and protection ring 16 which may militate against a tight, secure seal of the interior of the vessel.

As illustrated in FIG. 1, the pivot pin 36 and lifter member 38 are capable of movement in the directions of arrow 42. Normally, the pivot pin and lifter member are biased to the upward position and located in the lower position when the cover 14 not only is in position to close nozzle but locked to the nozzle by a plurality of clamps (not shown) received between a rib 14a around the cover and a recess 12a formed in the nozzle.

A hinge assembly 44 is mounted on assembly 34 for the purpose of connection of cover 14 and a movable piston rod of air spring assembly 10. The components of the hinge assembly, more particularly, are movable about the axis of pivot pin 36 as the piston rod retracts into and then extends out of the housing or cylinder 26 of the air spring assembly. The hinge assembly includes a pair of adapters 46 (only one adapter is shown) and a pair of support elements 48 (again, only one support element is shown). The support elements each include a leg 50 received by the cover. The legs 50 and the brackets 30 of assembly 34 may be welded or otherwise secured to the cover and nozzle 12, respectively. An opening or bore (not shown) is formed at one end of each adapter, and a second opening or bore 52 is formed at the other end of the adapters. Pivot pin 36 is received through the first opening formed in adapter 46. The structures of the adapters and pivot pin are suitably connected so that each adapter is able to move pivotally about the pivot pin between the position of FIG. 1 (the open position) and a position at which bore 52 would locate generally above the lifter member 38 (the closed position). The adapters 46 and support elements 48 are mechanically connected by a plurality of pins 54, 56 whereby movement of each adapter is followed by movement of each support element when the air spring assembly shall assist in the opening and closing of the cover.

Figure 2:
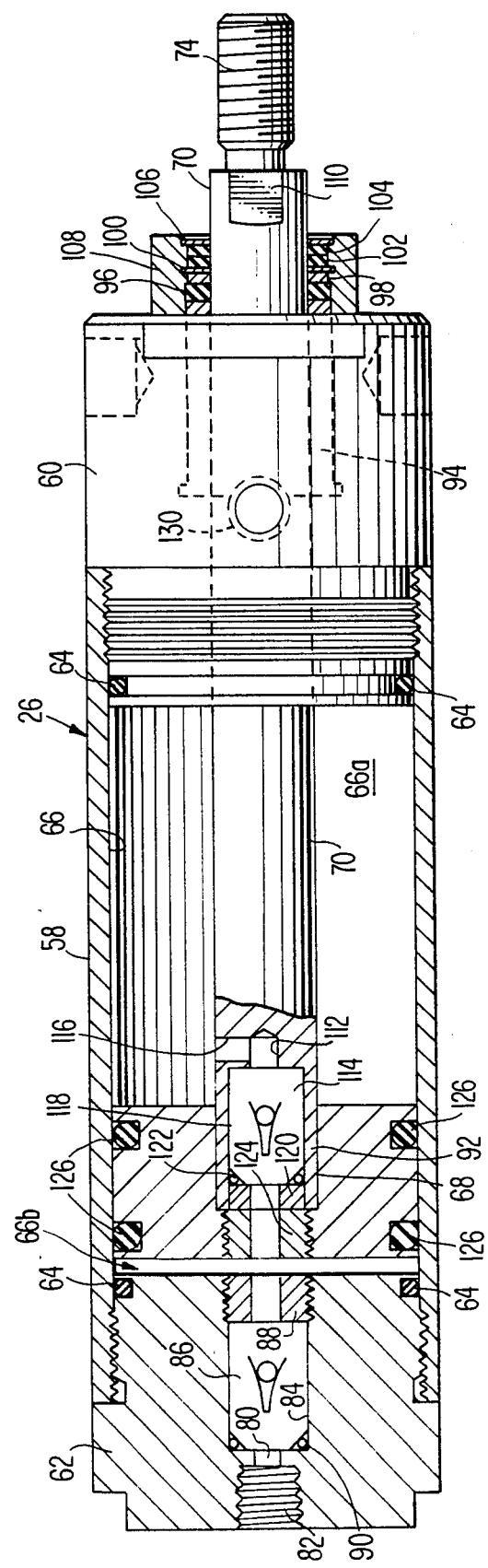
FIG. 2 is a view in section of the air spring assembly of FIG. 1 for developing a pulling force.

The air spring assembly 10 may be seen to best advantage in FIG. 2. As illustrated the housing or cylinder 26 includes a main portion 58 of cylindrical outline, a head at the rod end and a cap 62 at the other end of the cylinder. Both the cap and head may be threaded on the cylindrical portion to a position at which an annular shoulder formed on the head and cap moves into position against a respective end of the cylindrical portion. An O-ring 64, or the equivalent, residing within a cut out at the forward end of both the head and cap serves to seal the connection and isolate an internal chamber 66 of the air spring assembly 10 from ambient conditions.

A piston 68 is movable within the cylinder throughout the chamber 66 between the position of FIG. 2 (the cover open position) and a position at which the piston locates within the region of head 60 incident to movement of the cover to a position to close the nozzle 12. A rod 70 and associated structure, see FIG. 1, provides a connection between piston 68 and adapter 46 of the hinge assembly. The associated structure includes a rod eye 72 and a threaded adapter 74. The rod eye includes a body having a first bore of circular outline, received between adapters 46 and secured to the adapters by a pin 76 which extends through the bore in the rod eye and the bores 52 in each adapter. A threaded bore, located transverse to the first bore, extends into the body toward the first bore. The threaded adapter is threaded at both ends and completes a threaded connection between piston rod 70 and rod eye 72. A set screw 78 is located in an additional bore in rod eye 72 to "lock" the members at any desired axial spacing defined by the confronting ends of the rod eye and piston rod 70. The spacing may be increased or decreased.

In the assist of movement and to attain the proper balance of cover 14 between positions of open and closed, the air cylinder of the air spring assembly 10 will be charged. The charging of the air cylinder is automatic and may be carried out merely by opening and closing the cover 14. In the procedure to be discussed, the air cylinder is used as its own pump.

Referring to FIG. 2, the cap 62 of the air spring is machined to provide a bore 80 formed along its axis. The bore 80 is counterbored from opposite ends of the cap. The counterbores are identified as bores 82 and 84. The bore 82 is threaded and the bore 84 is threaded throughout a portion of its length, from the end of the cap. A checkvalve 86 is received within the unthreaded portion of bore 84. The threaded length suitably receives a retainer 88, also threaded, which is moved into contact with the checkvalve to urge the checkvalve into contact with a valve seal 90. The valve seal is located at a shoulder between bores 80 and 84 and seals the bore 84. The retainer has an annular body so that the path of flow through the bore 82, checkvalve 86 and bore 84 is open and depending upon the operative condition of the checkvalve 86 will communicate ambient air to chamber 66, and particularly a subchamber 66b.

Piston 68 is formed with a central bore 92, a portion of which is threaded from the side adjacent cap 62. The threaded length provides a threaded seat for one end of piston rod 70, the other end of which extends toward head 60 and out of the housing 26. Thus, the piston rod is supported at one end by the piston and by a bearing 94 at a location along the piston rod spaced from the piston. The bearing comprises a cylindrical sleeve which extents from the end of the head throughout a distance into chamber 66. The piston rod is sealed externally of housing 26. The seal includes a stack of components including a seal 96, washer 98, snap ring 100, a wiper 102, washer 104 and a snap ring 106. The sealing structure is located within a housing 108 carried on the outside of the end of head 60. The piston rod, in a position outside of housing 108, includes a pair of opposite flats 110 for rotating the piston rod in adjustment of the space or gap between confronting ends of the piston rod and rod eye 72.

The piston rod, particularly the end in threaded engagement in the piston 68, is provided with a bore at 112 along its axis, and a counterbore along a portion of the length of bore 112. The counterbore is identified as bore 114. A further bore 116 is located radially in the piston rod to communicate bore 112 and chamber 66.

A checkvalve 118 is located in bore 114. The checkvalve is secured by a washer 120 which confronts against a face of the checkvalve in a seated position. A valve seal 122 between the structures seals the bore 114. A valve retainer 124 threaded into the threaded length of bore 114 supports the checkvalve. The washer and valve retainer, like the valve retainer 88 are of annular outline to extend the communicating path between subchamber 66b and a subchamber 66a under circumstances that the checkvalve 118 is open. A pair of O-rings 126 or the equivalent provide a seal between the piston and the inner surface of cylinder 26.

In operation, the air spring assembly may be automatically charged by the action of opening and closing cover 14. This automatic charging operation in all likelihood will be necessary at times during extended periods to compensate for minute leakage of air from the chamber 66. This leakage of air will take place past the O-rings, seals and the threads of the various threaded components. The charging of the air spring assembly, then, will permit a proper balancing of the cover 14.

Under circumstances that the air spring assembly does not provide the proper balancing and assist for movement of cover 14, due to a slight loss of air, a necessary charging of the air spring will be accomplished automatically during normal use of the cover through a cycle of movements from a position of closure to an open position or vise versa. The movement will automatically charge the air spring to a maximum pressure determined by the length of the gap or space between the confronting ends of rod eye 72 and piston rod 70 which effectively changes the ratio of the volumes of subchamber 66a to subchamber 66b. As previously indicated, the gap or space may be adjusted by rotation of the piston rod relative to the rod eye and threaded adapter 74 which interconnects the rod eye and piston rod. Any position set may be retained by the set screw 78.

The cover 14 may be moved to the position of closure from the position in FIG. 1, and at a time during this movement followed by movement of piston 68 from the cap end to the rod end of cylinder 26 the checkvalve 86 will automatically open to allow air to enter subchamber 66b if the pressure in the subchamber is negative. Air enters the chamber to balance the pressures both within and without the chamber. Otherwise, a partial vacuum would exist within subchamber 66b. The checkvalve typically will operate with an audible click. The cover, then, is returned to the open position of FIG. 1 followed by movement of the piston in the opposite direction. With this action, if air was drawn into subchamber 66b from the atmosphere during movement of the cover to the closed position, followed by movement of the piston from the cap end to the rod end of the cylinder, the pressure in subchamber 66b builds to a point that the pressure exceeds the pressure in subchamber 66a. At this point checkvalve 118 opens allowing some of the air to move from subchamber 66b to subchamber 66a. The cover is moved to a closed position, once again, and piston returns to the rod end of the air spring. By this action an increased quantity of air will be compressed within subchamber 66a. The opening and closing of the cover 14 through one or more cycles as may be necessary will result in a slight increase in the force that the piston rod 70 previously exerted on the cover 14 through the connecting structure. Thus, the "balance" of the cover has been incrementally increased.

The charging procedure is continued through any number of cycles required for full balancing of the cover 14. A full and complete balancing force of the air spring, without over charging, will be attained when the click of checkvalve 86 no longer is audible, and as indicated a balancing force may be adjusted by adjusting the gap between confronting ends of the rod eye 78 and the piston rod 70. If the cylinder is accidentally overcharged by incorrect adjustment of rod eye 72, a port plug may be removed from port 130. This will relieve excess pressure. The port plug may then be returned. During the cycle of movement of cover 14, the pivot axis for the cover about pivot pin 36 locates to various positions. This movement requiring relocation of the axis of piston rod 70 is accommodated by the ability of housing 26 to pivot about pins 28.

Figure 3:
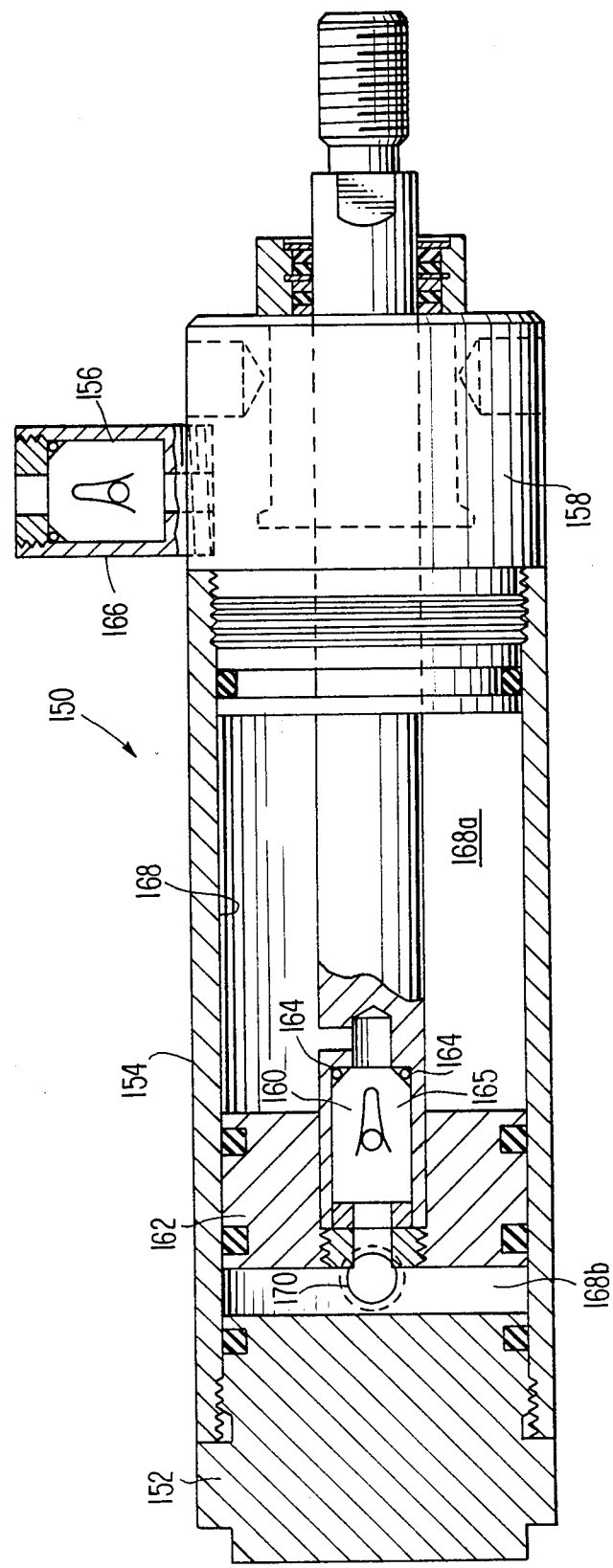
FIG. 3 is a view in section of an air spring assembly for developing a pushing force.

The air spring assembly may also be used to develop a push force. To this end, referring to FIG. 3 there is a showing of an air spring assembly 150 which except as follows, generally may be likened to the air spring assembly 10 of FIG. 2. According to FIG. 3, the cap 152 received on one end of housing 154 may be of the construction shown, that is solid, in construction. The cap may also be formed with a port (not shown) extending, for example, along its axis. A port plug (also not shown) will be provided for closing the port. The purpose of the port, as previously discussed in the discussion of port 130, is to relieve pressure under conditions that the air spring 150 is overcharged. FIG. 3 illustrates an alternative location of the port, identified as port 170, in subchamber 168b. A checkvalve 156 is disposed in head 158 received on the opposite end of the housing. The construction of housing duplicates that of housing 26, and both the cap 152 and head, 158 are received by housing 154 in the manner that cap 60 and head, 62 are received by housing 26.

In addition to the receipt of checkvalve 156 in head 158, a checkvalve 160 is located in piston 162 in the orientation reversed from that of checkvalve 118 in piston 68. Referring still to FIG. 3, it will be apparent that the overall construction of piston 162 remains the same as the piston 68, and the securement of the checkvalve in the piston duplicates the manner of securement of checkvalve 118. A seal 164 for purposes of sealing a bore 165 is located to the upstream end of the bore.

The checkvalve 156 may be installed through the wall of cap 158. The checkvalve may also be installed in a housing 166 carried by the wall, as illustrated in FIG. 3.

The operation of the air spring generally will follow the operation discussed above. Thus, housing 154 includes a chamber 168 including subchambers 168a, 168b. The subchamber 168a is located to the rod side of piston 162 and subchamber 168b is located to the other side of the piston. Under circumstances of a negative pressure occurring in subchamber 168a the checkvalve 156 will automatically open to allow air to enter the subchamber. The presence of a negative pressure, if the pressure becomes negative, will follow movement of piston 162 to the left in FIG. 3. The amount of air that enters the subchamber will balance the pressures both within and without. Upon movement of piston 162, to the right in FIG. 3, and under circumstances that air was drawn into subchamber 168a, the pressure in subchamber 168a will build to a point that the point checkvalve 160 will open allowing some of the air to move from subchamber 168a to subchamber 168b. Movement of the piston through these cycles of movement will complete the charging procedure, all as previously discussed and with actions of the checkvalves as previously discussed, also.

We claim:

1. An air spring assembly to assist in movement of a movable member including a cylinder formed by a housing having a chamber therein, cap means for closing opposite ends of said cylinder and sealing said chamber from ambient conditions, a piston, a rod extending through one of said cap means to a first end outside said chamber, means attaching the second end of said rod to said piston so that said piston and rod move conjointly upon relative movement of said housing and piston through each complete cycle of movement between limit positions, said piston serving to divide said chamber into a first subchamber on one side of said piston and a second subchamber on the other side of said piston, a first checkvalve means connected between said first subchamber and the atmosphere, and a second checkvalve means in said piston and connecting said first and second subchambers, said second checkvalve means and said piston cooperating with said chamber in said housing to retain gas in said second subchamber under pressure elevated with respect to the pressure in the first subchamber under normal circumstances, said first and second checkvalve means being automatically operable for both pressurizing said second subchamber to a pressure level to balance the force to be exerted on said movable member and restoring pressure to said second subchamber previously charged in the maintenance of said pressure level under circumstances of leakage of pressure from said second subchamber, initial pressurization of said second subchamber and the restoration of pressure in said second subchamber being carried out by flow of a compressible fluid from said first to said second subchamber through said second checkvalve upon movement of said piston in one direction with respect to said housing through at least one cycle of movement, and means for connecting one of said housing and rod at first end to a support and the other of said housing and rod to said movable member requiring assistance in movement by one of a pushing and a pulling force.

2. The air spring assembly of claim 1 wherein said support comprises a stationary structure.

3. A combination including the air spring assembly of claim 2, a closure defined by said movable member for closing an opening to a confined space, and an interconnect means for connecting said closure to one of said housing and rod, and wherein said connection means includes said stationary structure for supporting the other of said housing and rod.

4. The combination of claim 3 wherein said first checkvalve is located to provide a communicating path between said first subchamber and ambient conditions, and is operable substantially during relative movement of said piston and housing and under an existent condition of a negative pressure in said first subchamber closed by said one cap means as said first subchamber undergoes an increase in volume, and said second checkvalve located in said piston is operable to provide communication between said first subchamber and said second subchamber in both charging said second subchamber to said pressure level and restoring lost pressure to said second subchamber.

5. The combination of claim 4 wherein said one cap means comprises said cap means at the rod end of said cylinder.

6. The combination of claim 5 wherein said housing is connected to said stationary structure and relative movement of said closure by a pushing force exerted on said closure through said interconnect means.

7. The combination of claim 4 wherein said one cap means comprises said cap means at the end of said cylinder opposite said rod end.

8. The combination of claim 7 wherein said housing is connected to said stationary structure and relative movement of said housing and rod assists in movement of said closure by a pulling force exerted on said closure through said interconnect means.

9. The combination of claim 3 wherein said housing is supported on said stationary structure of said connection means, and said interconnect means includes a pivot axis, a first element connected to said closure mounted for movement about said pivot axis, an interlink means connected between said rod and first element, said interlink means providing an adjustable connection whereby the stroke of said piston and rod may be either reduced or extended in determining said charge level.

10. The combination of claim 9 wherein said interlink means comprises a plug having an external thread, a second element, means for mounting said elements whereby said elements move concurrently about said pivot axis as said second element pivots relative to said first element, and wherein said second element and rod are threaded along an axis for receipt of said plug.

11. The combination of claim 3 whereby said opening to said confined space is defined by a nozzle of a vessel, and said closure is movable to open and close said nozzle.

12. The air spring assembly of claim 1 wherein said first checkvalve is located to provide a communicating path between said first subchamber and ambient conditions, said first checkvalve operable substantially during relative movement of said piston and housing and under an existent condition of a negative pressure in said first subchamber closed by said one cap means as said first subchamber undergoes an increase in volume, and said second checkvalve located in said piston being operable to provide communication between said first subchamber and said second subchamber in restoring lost pressure to said second subchamber.

13. The air spring assembly of claim 12 wherein said one cap means comprises said cap means at the rod end of said cylinder.

14. The air spring assembly of claim 13 wherein said housing is connected to said support and relative movement of said housing and rod assists in movement of said movable member by a pushing force.

15. The air spring assembly of claim 12 wherein said one cap means comprises said cap means at the end of said cylinder opposite said rod end.

16. The air spring assembly of claim 15 wherein said housing is connected to said support and relative movement of said housing and rod assists in movement of said movable member by a pulling force.

* * * * *